United States Patent
Lee et al.

(10) Patent No.: US 9,977,598 B2
(45) Date of Patent: May 22, 2018

(54) ELECTRONIC DEVICE AND A METHOD FOR MANAGING MEMORY SPACE THEREOF

(71) Applicant: MediaTek Inc., Hsin-Chu (TW)

(72) Inventors: Chung-Jung Lee, Taipei (TW);
Nicholas Ching Hui Tang, Zhudong Township, Hsinchu County (TW);
Chin-Wen Chang, Taichung (TW);
Min-Hua Chen, Taichung (TW);
Chih-Hsuan Tseng, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 212 days.

(21) Appl. No.: 14/791,703

(22) Filed: Jul. 6, 2015

(65) Prior Publication Data
US 2016/0117116 A1 Apr. 28, 2016

Related U.S. Application Data

(60) Provisional application No. 62/068,808, filed on Oct. 27, 2014.

(51) Int. Cl.
*G06F 12/00* (2006.01)
*G06F 3/06* (2006.01)
*G06F 12/02* (2006.01)

(52) U.S. Cl.
CPC .......... *G06F 3/0608* (2013.01); *G06F 3/0638* (2013.01); *G06F 3/0647* (2013.01); *G06F 3/0658* (2013.01); *G06F 3/0673* (2013.01); *G06F 12/023* (2013.01); *G06F 2212/401* (2013.01); *Y02B 60/1225* (2013.01)

(58) Field of Classification Search
CPC ............... G06F 3/0608; G06F 3/0638; G06F 2212/401; G06F 3/0658; G06F 3/0673; G06F 3/0647
See application file for complete search history.

(56) References Cited

U.S. PATENT DOCUMENTS

| | | | |
|---|---|---|---|
| 9,141,554 B1* | 9/2015 | Candelaria | G06F 12/0864 |
| 2006/0259448 A1* | 11/2006 | Yeo | H03M 7/30 |
| 2009/0132619 A1* | 5/2009 | Arakawa | G06F 3/0605 |

OTHER PUBLICATIONS https://kernelnewbies.org/Linux_3.14#head-72b295b09fea85de2e80f0b7850048264fed887e, Linux 3.14, Mar. 30, 2014, section 1.2.*

* cited by examiner

*Primary Examiner* — Reginald Bragdon
*Assistant Examiner* — Hannah A Faye-Joyner
(74) *Attorney, Agent, or Firm* — McClure, Qualey & Rodack, LLP

(57) ABSTRACT

The present invention provides a method for managing memory space in an electronic device including: selecting a candidate page from a first memory space for swapping the candidate page out of the first memory space into the second memory space; compressing the candidate page to obtain a first compressed page and a first hash value of the first compressed page; performing a comparison using the first hash value of the first compressed page and the hash values of the pages stored in a second memory space to find whether the pages have the same content as the first compressed page or the candidate page; and if a page is found to have the same content as the first compressed page or the candidate page, mapping a virtual address of the first compressed page or the candidate page to the found page.

16 Claims, 6 Drawing Sheets

| HV0 | HV1 | HV2 | HV3 | HV5 | HV6 | HV7 |
|-----|-----|-----|-----|-----|-----|-----|
|     |     | HV8 | HV4 |     |     |     |
|     |     | HV9 |     |     |     |     |
|     |     | HV10|     |     |     |     |

FIG. 3

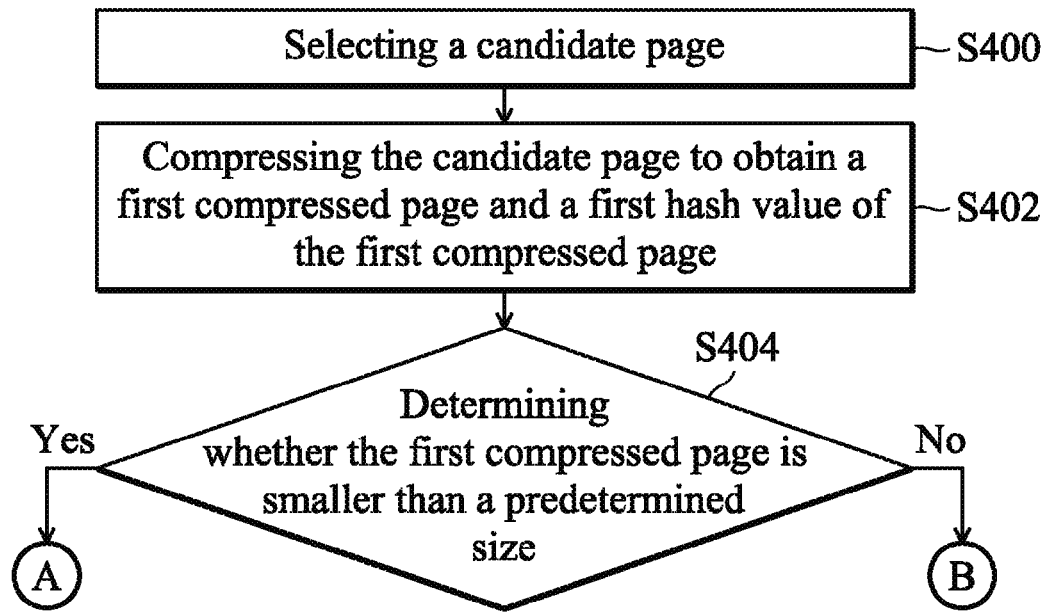
FIG. 4A
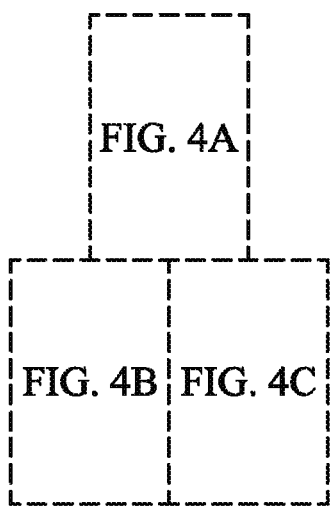

ELECTRONIC DEVICE AND A METHOD FOR MANAGING MEMORY SPACE THEREOF

CROSS REFERENCE TO RELATED APPLICATIONS

This Application claims priority of U.S. Provisional Application No. 62/068,808, filed on Oct. 27, 2014, the entirety of which is incorporated by reference herein.

BACKGROUND OF THE INVENTION

Field of the Invention

The present invention relates to a method for managing memory space in an electronic device, and in particular to a method capable of merging data by using hash values.

Description of the Related Art

Presently, electronic devices are highly developed and multi-functional. For example, electronic devices such as mobile phones and laptops are capable of conducting telecommunications, receiving and transmitting e-mails, maintaining social networks, managing contacts, and playing media. Hence, the electronic devices need more memory space to store the program codes, parameters and files of the applications.

Memory resources for low-cost devices are very important. Some low-cost devices only have 256 MB or less memory space. Hence, some memory-saving methods have been proposed. However, all memory-saving methods are trade-offs between computation and memory usage. More specifically, current memory-saving methods need a lot of resources from the controller to perform calculations and comparisons. The complicated calculations and comparisons will increase the system power consumption and working period.

BRIEF SUMMARY OF THE INVENTION

A detailed description is given in the following embodiments with reference to the accompanying drawings.

An exemplary embodiment provides a method for managing memory space in an electronic device, wherein the electronic device includes a first memory space and a second memory space. The method includes: selecting a candidate page from the first memory space of the electronic device for swapping the candidate page out of the first memory space into the second memory space; compressing the candidate page to obtain a first compressed page and a first hash value of the first compressed page; if the first compressed page is smaller than a predetermined size, performing a comparison using the first hash value of the first compressed page and one or more second hash values of one or more second compressed pages stored in the second memory space to find whether any of the one or more second compressed pages has the same content as the first compressed page, wherein the respective size of each of the one or more second compressed pages is smaller than the predetermined size; mapping a virtual address of the first compressed page to the one or more second compressed page with the same content as the first compressed page; if the first compressed page is larger than the predetermined size, performing a comparison using the first hash value of the first compressed page and one or more third hash values of one or more uncompressed pages stored in the second memory space to find whether any of the one or more uncompressed pages has the same content as the candidate page, wherein the respective size of each of one or more compressed pages obtained by compressing the one or more uncompressed pages is larger than the predetermined size; and mapping a virtual address of the candidate page to the uncompressed page with the same content as the candidate page.

Another exemplary embodiment provides a method for managing memory space in an electronic device, wherein the electronic device includes a first memory space and a second memory space. The method includes: selecting a candidate page from the first memory space of the electronic device for swapping the candidate page out of the first memory space into the second memory space by the controller; compressing the candidate page to obtain a first compressed page and a first hash value by the controller; if the first compressed page is smaller than a predetermined size, performing a comparison using the first hash value of the first compressed page and one or more second hash values of one or more second compressed pages stored in the second memory space in a first specific data structure to find whether any of the one or more second compressed pages has the same content as the first compressed page, wherein the respective size of each of the one or more second compressed pages is smaller than the predetermined size; and mapping a virtual address of the first compressed page to the one or more second compressed page with the same content as the first compressed page.

Another exemplary embodiment provides a method for managing memory space in an electronic device, wherein the electronic device includes a controller, a first memory space and a second memory space. The method includes: selecting a candidate page from a first memory space for swapping the candidate page out of the first memory space into the second memory space; compressing the candidate page to obtain a first compressed page and a first hash value of the first compressed page; performing a comparison using the first hash value of the first compressed page and one or more hash values of one or more pages stored in a second memory space to find whether any of the pages has the same content as the first compressed page or the candidate page; and if a page of the pages is found to have the same content as the first compressed page or the candidate page, mapping a virtual address of the first compressed page or the candidate page to the found page.

Another exemplary embodiment provides an electronic device including a first memory space, a second memory space and a controller. The controller is configured to select a candidate page from the first memory space of the electronic device for swapping the candidate page out of the first memory space into the second memory space, compress the candidate page to obtain a first compressed page and a first hash value of the first compressed page, wherein the controller is further configured to perform a comparison using the first hash value of the first compressed page and one or more second hash values of one or more second compressed pages stored in the second memory space to find whether any of the one or more second compressed pages has the same content as the first compressed page if the first compressed page is smaller than a predetermined size, map a virtual address of the first compressed page to the one or more second compressed page with the same content as the first compressed page, perform a comparison using the first hash value of the first compressed page and one or more third hash values of one or more uncompressed pages stored in the second memory space to find whether any of the one or more uncompressed pages has the same content as the candidate page if the first compressed page is larger than the predetermined size, and map a virtual address of the candidate page to the uncompressed page with the same content as the candidate page, wherein the respective size of each of the one or more second compressed pages is smaller than the predetermined size, and the respective size of each of one or more compressed pages obtained by compressing the one or more uncompressed pages is larger than the predetermined size.

Another exemplary embodiment provides an electronic device including a first memory space, a second memory space and a controller. The controller is configured to select one or more pages from the first memory space of the electronic device for swapping the one or more candidate pages out of the first memory space into the second memory space, compress the one or more pages to obtain one or more compressed pages and one or more hash values, use the one or more hash values to check identicalness between contents of the pages, and merge the pages based on the checking result.

BRIEF DESCRIPTION OF THE DRAWINGS

The present invention can be more fully understood by reading the subsequent detailed description and examples with references made to the accompanying drawings, wherein:

FIG. 3 is a schematic diagram illustrating an embodiment of a hash table of an exemplary embodiment; and FIGS. 4A~4C are a flowchart of a method for managing memory space of an exemplary embodiment.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
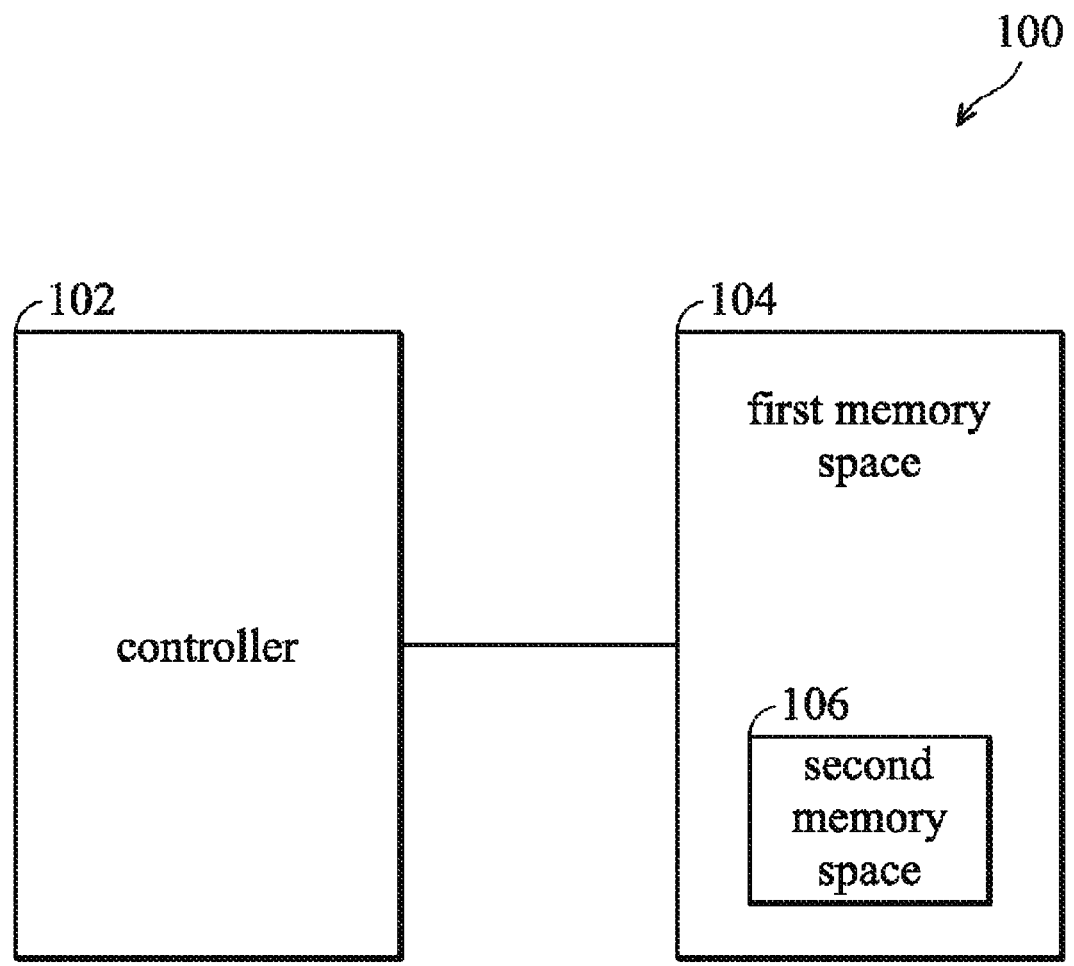
FIG. 1 is a schematic diagram illustrating an embodiment of an electronic device of an exemplary embodiment.

FIG. 1 is a schematic diagram illustrating an embodiment of an electronic device of an exemplary embodiment. The electronic device can be a memory system but is not limited thereto. The electronic device 100 includes a controller 102 (e.g., a processor, and/or a memory controller), a first memory space 104 and a second memory space 106.

In some embodiments, the controller 102 may include a computing unit, a non-volatile memory (such as read only memory), and a random access memory, but it is not limited thereto. The program code and data stored in the nonvolatile memory may constitute firmware, and be performed by the computing unit, such that the controller 102 may control the first memory space 104 and the second memory space 106 by the firmware. For example, the controller 102 may access the first memory space 104 and the second memory space 106 and automatically perform the method for managing memory space of the exemplary embodiment.

On the other hand, in one embodiment, the first memory space 104 is a dynamic random-access memory, and the second memory space 106 is a virtual memory space divided from the dynamic random-access memory, but it is not limited thereto. The second memory space 106 can be any type of memory space. For example, the second memory space 106 can be a compressed block device divided from the first memory space 104. In a specific example, the second memory space 106 can be a ZRAM in Linux kernel, but is not limited thereto. In other embodiments, the first memory space 104 and the second memory space 106 may be two individual/separate memory devices. In addition, each of the first memory space 104 and the second memory space 106 can be a flash memory, a read only memory, a hard disk, etc., although it is not limited thereto. Furthermore, each of the first memory space 104 and the second memory space 106 may include one or more pages arranged to store data.

There are some conditions that controller 102 needs to reduce quantity of data stored in the first memory space 104, e.g., when the quantity of data is approaching a memory limit of the first memory space 104.

In a method for saving memory space of the first memory space 104, the second memory space 106 is used as a ZRAM. The method is here referred to as ZRAM method. When a condition requiring data to be reserved in the second memory space occurs (e.g., the quantity of data is approaching the memory limit of the first memory space 104), the controller 102 may choose pages to be swapped out of the first memory space 104 into the second memory space 106. The chosen pages may those pages having not been used for a period but not limited thereto. The controller 102 may further compress the pages before storing them in the second memory space 106 for downsizing the memory space required to store the swapped pages. Normally about 50% of the memory space for storing swapped pages can be saved by using the compression process. However, the controller 112 may disregard the compression if the size of the compressed page is larger than a predetermined size. For example, if the size of the page after being compressed by the controller 102 is larger than ¾ an original size of the page, the page may be saved as the original page in the ZRAM.

In another method for saving memory space of the first memory space 104, the controller 102 may use KSM (Kernel same-page merging) to merge the pages with the same content to release the memory of the first memory space 104. The method is here referred to as KSM method. The controller 102 may periodically perform the merging process when the electronic device 100 is in an idle state. In the merging process, the controller 102 can define a window including one or more pages in the first memory space 104, and compares all of the contents of the pages in the window one by one to find the pages with the same content.

However, the execution speed of KSM is slow, because the controller 102 needs a lot of time to compare the pages byte by byte. Moreover, the memory saving ratio of KSM is low, because only pages in the same window are compared, and the pages in different windows cannot be merged even if they have the same content. Furthermore, the execution of the KSM daemon increases the power (e.g., 10 ~20%) of the electronic device 100 during the idle state.

Another method is provided below for saving memory space of the first memory space 104 with different embodiments, which can solve the problems encountered in the ZRAM method and KSM method while keeping their advantages. According to an embodiment of the method, when a condition requiring to save memory space of the first memory space occurs (e.g., the quantity of data is approaching the memory limit of the first memory space 104), the controller 102 can swap pages out of the first memory space 104 to the second memory space 106. The controller 102 can select one or more candidate pages from the first memory space 104 of the electronic device 100 and compress the candidate pages. And then the controller 102 can use hash values obtained during the compressing process to decide whether to merge either or both of the compressed candidate pages and the uncompressed candidate pages. And finally, the controller 102 can store the compressed/uncompressed candidate pages after being merged into the second memory space 106.

More specifically, the controller 102 selects one or more candidate pages to be swapped out from the first memory space 104. The candidate pages may be a page having not been used for a period, and/or a page not necessary to be accessed by any program, but not limited thereto.

The controller 102 may then compress the one or more candidate pages to obtain one or more first compressed pages. During the compression, not only the one or more first compressed pages but also one or more respective first hash values are generated. The controller 102 is further configured to perform a comparison between each of the one or more first hash keys and one or more hash keys previously obtained for other pages and determine whether to merge pages according to the comparison result.

Preferably, each of the one or more first compressed pages can be identified to belong to which of two groups, the comparison can be performed within the same group. Specifically, if a compressed size of the candidate page, i.e., a size of the compressed page is smaller than a predetermined size, the compressed page is identified to belong to a first group, and it can be compared to other pages within the first group. Similarly, if a compressed size of the candidate page, i.e., a size of the compressed page is larger than the predetermined size, the compressed page is identified to belong to a second group, and it can be compared to other pages within the second group.

More preferably, pages within either the first group or the second group can be preliminarily compared by using hash values and then compared byte by byte if the preliminary comparison indicates that the pages are probably the same. It should be noted that hash values are obtained from compression processes, which may include adding, subtracting, multiplying and/or dividing the content of the pages. Therefore, the pages with different hash values must have different contents. However, the pages with the same hash value may have the same content or different contents.

Specifically, if the first compressed page is smaller than the predetermined size (i.e. belonging to the first group), the controller 102 can perform a comparison between the first compressed page and one or more second compressed pages stored in the second memory space 106 to find whether any of the one or more second compressed pages has the same content as the first compressed page. The one or more second compressed pages can be one or more previous candidate pages which have been compressed and compared, and their respective sizes are smaller than the predetermined size (belonging to the first group) and are therefore stored in compressed forms. The second hash values are obtained from one or more compression processes for obtaining the one or more second compressed pages of the previous candidate pages. The first hash value and the one or more second hash values can be converted to values more suitable for being compared to each other.

When the comparison indicates one of the one or more second hash values (or converted values thereof) of the one or more second compressed page is the same as the first hash value (or a converted value thereof), the controller 102 can further compare the content of the first compressed page and the one of the one or more second compressed page byte by byte to determine whether the contents of the first compressed page and the one of the one or more second compressed page are the same.

When the controller 102 determines that the content of the first compressed page and the one of the one or more second compressed pages are the same, the controller 102 can map the virtual address of the first compressed page to the one of the one or more second compressed pages that has the same content as the first compressed page. The controller can further discard data of the contents of the first compressed page and the candidate page in the first memory space 104.

Conversely, when the controller 102 determines that the content of the first compressed page is not the same as the content of any of the one or more second compressed pages (different hash keys; or the same hash keys but different byte-by-byte compared contents), the controller 102 can store the first compressed page (i.e., in an uncompressed form of the candidate page) into the second memory space 106. The controller 102 may discard data of the content of the first compressed page and the candidate page in the first memory space 104.

On the other hand, if the first compressed page is larger than the predetermined size (i.e., belonging to the second group), the controller 102 is configured to perform a comparison using the first hash value of the first compressed page and one or more third hash values of one or more uncompressed pages stored in the second memory space 106 to find whether any of the one or more uncompressed pages has the same content as the candidate page. The one or more uncompressed pages are the previous candidate pages which have been compressed and compared, and their respective sizes are larger than the predetermined size (belonging to the second group) and are therefore stored in uncompressed forms. The third hash values are obtained from one or more compression processes having performed for the one or more uncompressed pages. The first hash value and the one or more third hash values can be converted to values more suitable for being compared to each other.

Similar to the comparison for the first group, when the comparison for the second group indicates one of the one or more third hash values (or converted values thereof) of the one or more uncompressed pages is the same as the first hash value (or a converted value thereof), the controller 102 can further compare the content of the candidate page and the one of the one or more uncompressed page byte by byte to determine whether the contents of the first compressed page and the one of the one or more uncompressed page are the same.

When the controller 102 determines that the content of the candidate page and the one of the one or more uncompressed pages are the same, the controller 102 can map the virtual address of the candidate page to the one of the one or more uncompressed pages that has the same content as the first compressed page. The controller can further discard data of the contents of the first compressed page and the candidate page in the first memory space 104.

Conversely, when the controller 102 determines that the content of the first compressed page is not the same as the content of any of the one or more uncompressed pages (different hash keys; or the same hash keys but different byte-by- byte compared contents), the controller 102 can store the candidate page (i.e., in an uncompressed form) into the second memory space 106. The controller 102 may discard data of the content of the first compressed page and the candidate page in the first memory space 104.

It is noted that the comparison between hash keys for either the first group or the second group can be performed by utilizing a specific data structure. The first specific data structure can be a RB tree as exemplarily depicted in FIG. 2, a hash table as exemplarily depicted in FIG. 3, and any other specific type of data structure suitable for comparison, as explained below.

Figure 2:
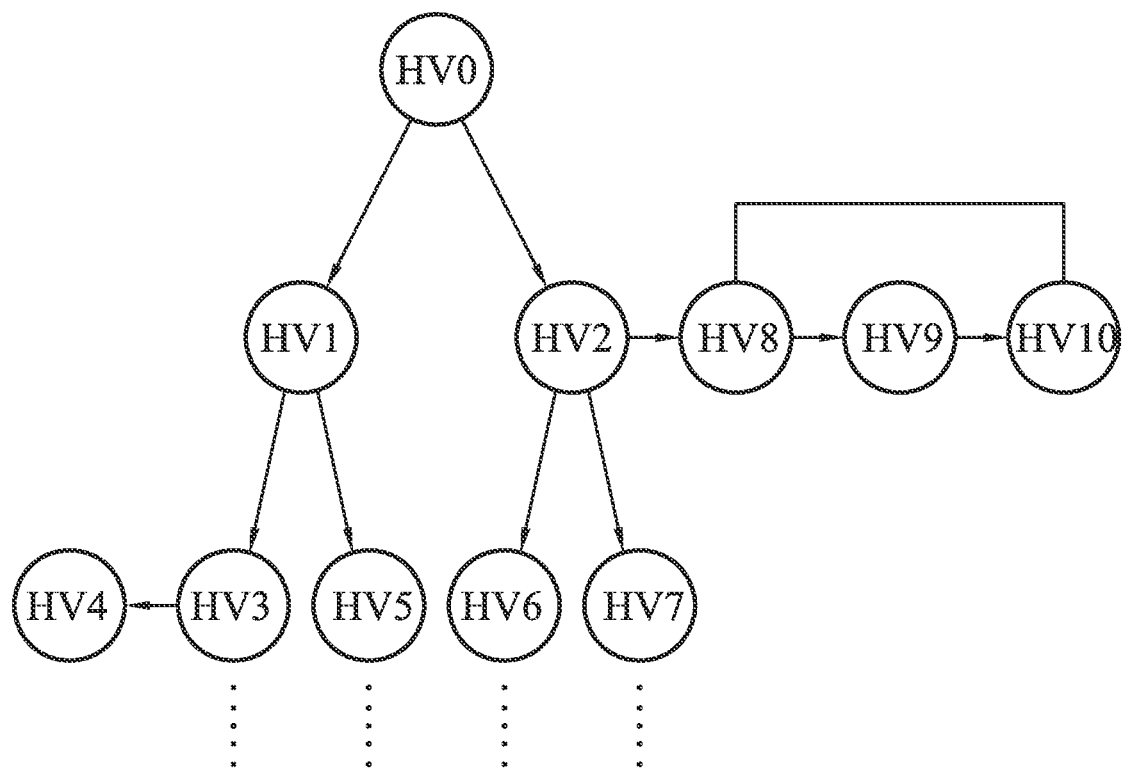
FIG. 2 is a schematic diagram illustrating an embodiment of a RB tree of an exemplary embodiment.

FIG. 2 is a schematic diagram illustrating an embodiment of a RB tree of an exemplary embodiment. The RB tree is a specific data structure maintained by controller 102 using the hash values HV0~HVN, wherein the RB tree can be stored in the first memory space 104 or other memory devices of the electronic device 100.

As described below, the controller 102 can find the same hash value through the RB tree, and maintain the RB tree based on the obtained hash values. In an exemplary case, when the controller 102 first obtains a hash value HV, the controller 102 starts to construct the RB tree by setting the hash value HV0 as a node. Later when the controller 102 obtains a hash value HV1, it can sort the hash value HV1 from the node of the hash value HV0 and add the hash value HV1 as a node linked to the node of HV0. Since the hash value HV1 is smaller than the hash value HV0, so the controller 102 can sort and add the hash value HV1 to the lower left branch of the hash value HV0.

Similarly, later when the controller 102 obtains a hash value HV2, the controller 102 can sort the hash value HV2 from the node of the hash value HV0 and add the hash value HV1 as a node to the RB tree. Since the hash value HV2 is larger than the hash value HV0, so the controller 102 can sort and add the hash value HV2 to the lower right branch of HV0.

Similarly, later when the controller 102 obtains a hash value HV3, the controller 102 can sort the hash value HV3 from the node of the hash value HV0 and add the hash value HV3 as a node to the RB tree. Since the hash value HV3 is smaller than the hash value HV0, the controller 102 can sort it towards the node of the hash value HV1, and since the hash value HV3 is again smaller than the hash value HV1, so the controller 102 can add the hash value HV3 as a node to the lower left branch of HV1.

Similarly, later when the controller 102 obtains a hash value HV4, the controller 102 can sort the hash value HV4 from the hash value HV0. Since the hash value HV4 is smaller than the hash value HV0, the controller 102 can sort the hash value HV4 toward the node of the hash value HV1. Since the hash value HV3 is again smaller than the hash value HV1, the controller 102 can sort towards the node of the hash value HV3. Since the hash value HV4 is equal to the hash value HV3, the controller 102 an add the hash value HV4 as a node to a branch parallel to the hash value HV3. The controller 102 can sort and add any hash key to the RB tree in a similar manner.

As shown, the hash value with the same values can be linked in a parallel directly in the RB tree. As shown, the nodes of the hash value HV8 and the hash value HV10 having the same values can be linked in a parallel direction in the RB tree. It should be noted that the hash values are obtained by compressing pages. The pages with different hash values must have different contents, but the pages with the same hash value may have the same content or different contents and require further comparison. Therefore, the pages that correspond to the hash value HV8 and the hash value HV10 may have the same content or different contents.

Figure 3:
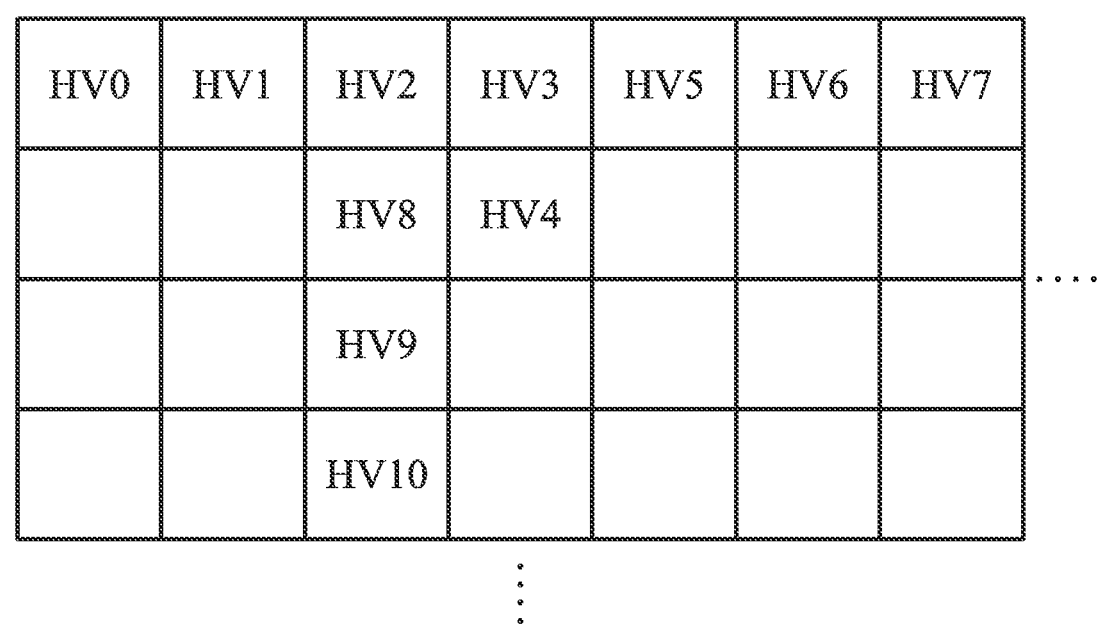

FIG. 3 is a schematic diagram illustrating an embodiment of a hash table of an exemplary embodiment. The hash table is a specific data structure maintained by controller 102 using the hash values HV0~HVN, wherein the hash table can be stored in the first memory space 104 or other memory devices of the electronic device 100. In the hash table, hash values can be written into the first row as the hash values are obtained by the controller 102. When a hash value of the same value as other one or more hash values in the hash table is obtained, the hash value can be written into the same column as the other one or more hash values with the same value. Therefore, the controller 102 can scan the first row to find the hash values with the same value.

Figure 4B:
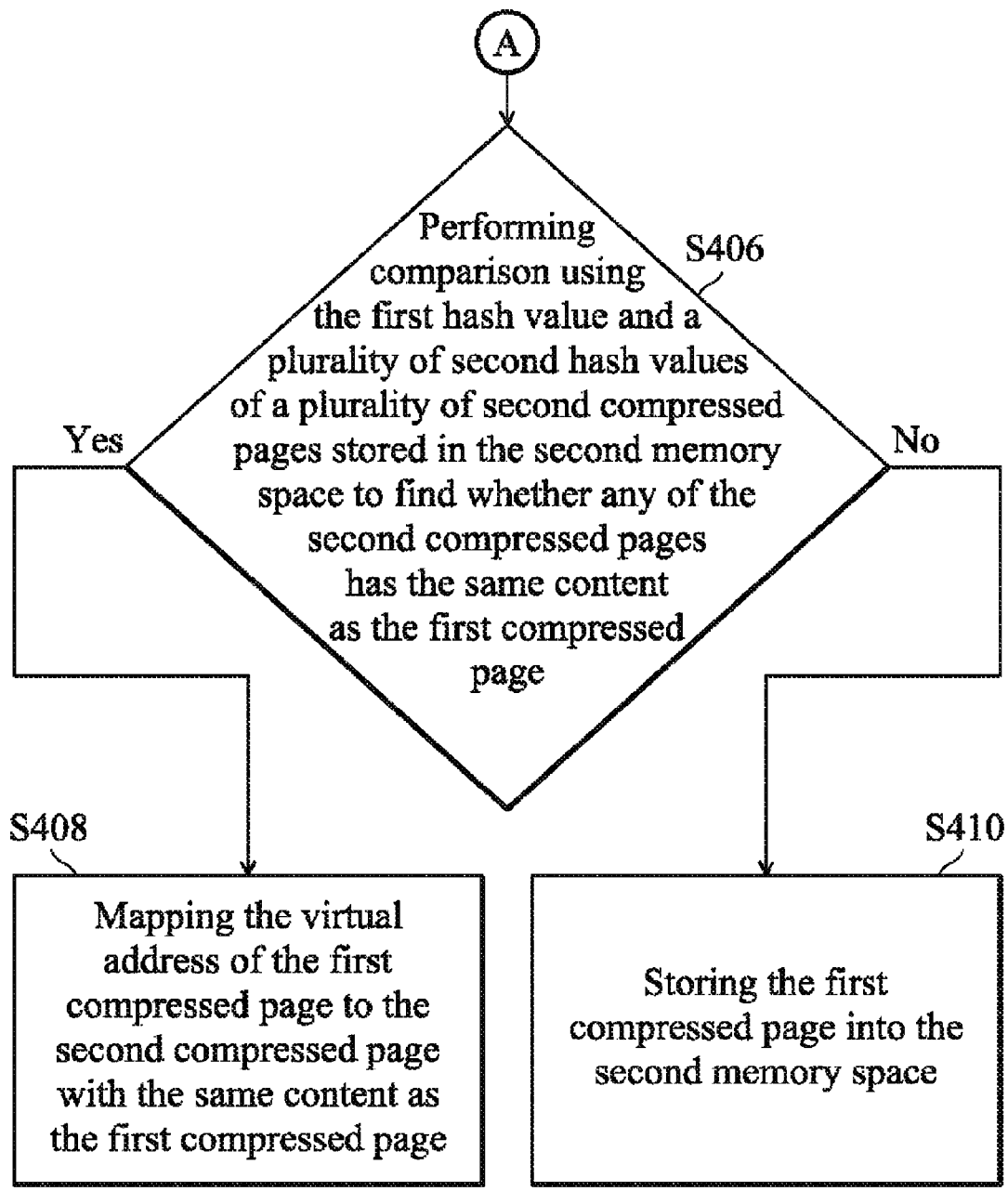
Figure 4C:
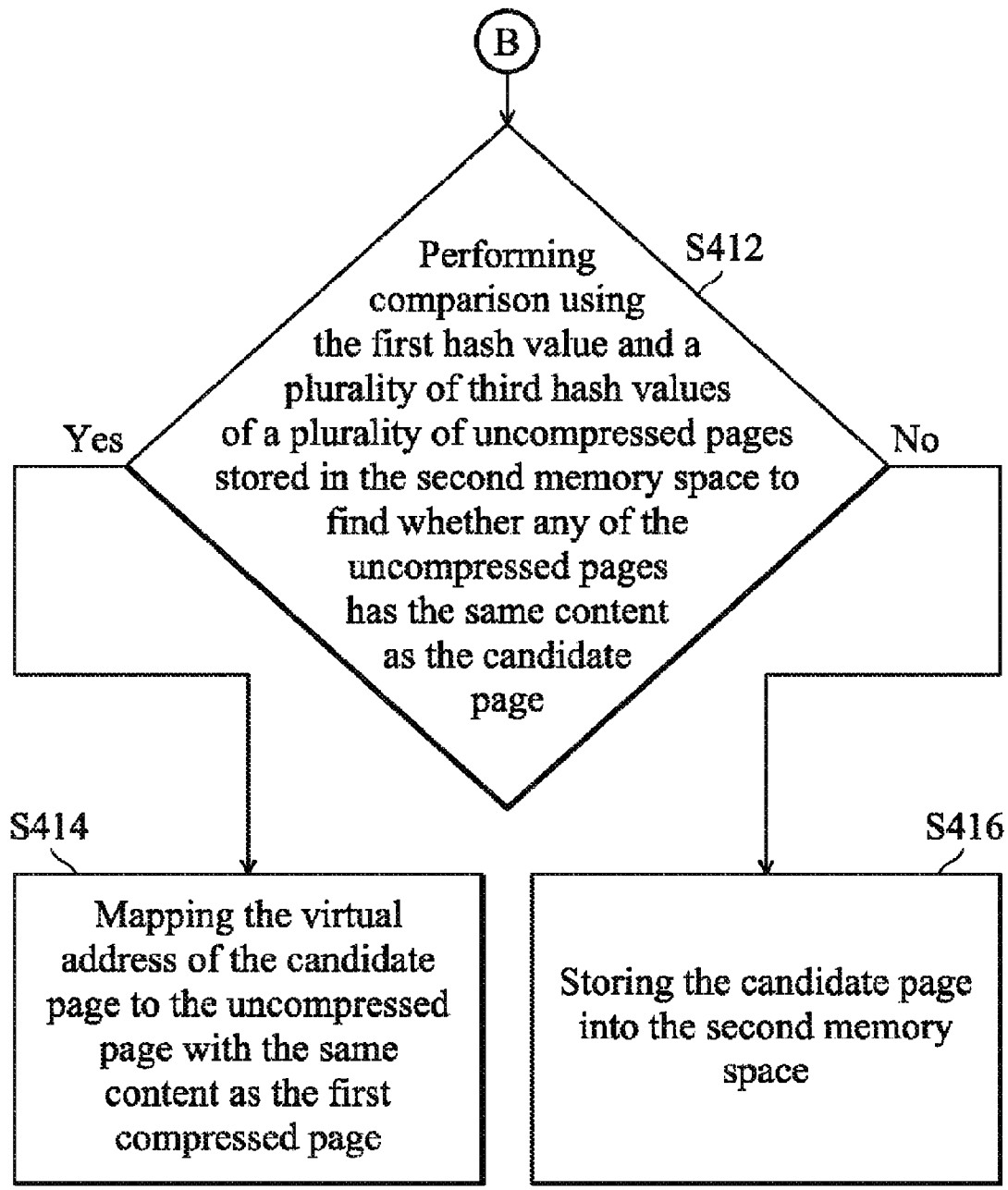

FIG. 4 is a flowchart of a method for managing memory space of an exemplary embodiment. The method can be applied to the electronic device 100 of FIG. 1. The method can be arranged to maintain data stored in the first memory space 104 when the quantity of data is approaching a memory limit of the first memory space 104. In this embodiment, one or more candidate pages that are to be swapped from the first memory space 104 to the second memory space 106 can be selected from the first memory space 104. The candidate pages can then be compressed. A respective hash value for each of the candidate pages obtained by compressing the candidate pages can be used to determine whether to merge the compressed/uncompressed candidate page with one or more previous compressed/uncompressed candidate pages that have be stored in the second memory space 106.

More specifically, the method can start at step S400, where a candidate page can be selected from the first memory space 104 of the electronic device 100 to be swapped into the second memory space 106. Next, in step S402, the candidate page can be compressed to obtain a first compressed page and a first hash value of the first compressed page. Next, in step S404, whether the first compressed page is smaller than a predetermined size can be determined. When the first compressed page is smaller than the predetermined size, the process goes to step S406, otherwise, the process goes to step S412.

In step S406, a comparison can be performed using the first hash value of the first compressed page and one or more second hash values of one or more second compressed pages stored in the second memory space 106 to find whether any of the one or more second compressed pages has the same content as the first compressed page. When any of the one or more second compressed pages has the same content as the first compressed page, the process goes to step S408, otherwise, the process goes to step S410. The one or more second compressed pages are compressed forms of one or more previous candidate pages, each having a respective size smaller than the predetermined size, and the one or more second hash values are obtained from compressing the previous candidate pages to obtain the one or more second compressed pages.

When one of the one or more second hash values is the same as the first hash value, the contents of the first compressed page and the second compressed page with the same hash values as the first hash value can be further compared byte by byte to confirm whether the contents of the first compressed page and the second compressed page are really the same. When the content of the first compressed page is the same as the content of any of the one or more second compressed page, the step goes to step S408, otherwise, the step goes to step S412.

In step S408, a virtual address of the first compressed page can be mapped to the second compressed page with the same content as the first compressed page. Moreover, data of the content of the first compressed page and the candidate page can be disregarded. The process can then end at step S408. Conversely, in step S410, the content of the first compressed page can be saved into the second memory space 106, and the content of the candidate page in the first memory space can be disregarded. The process ends at step S410.

In step S412, the first hash value of the first compressed page and one or more third hash values of one or more uncompressed pages stored in the second memory space 106 can be compared to find whether any of the one or more uncompressed pages has the same content as the candidate page. When any of the one or more uncompressed pages has the same content as the candidate page, the processes goes to step S414, otherwise, the process goes to step S416. The one or more uncompressed pages can be uncompressed forms of one or more previous candidate pages, each having a respective size larger than the predetermined size, and the third hash values are obtained from compressing the previous candidate pages.

When the third hash value of any of the one or more uncompressed pages is the same as the first hash value, the content of the candidate page and the uncompressed page can be further compared byte by byte to confirm whether the content of the candidate page and the content of the uncompressed page are the same. When the content of the uncompressed page and the content of the candidate page are the same, the process goes to step S414, otherwise, the step goes to step S416.

In step S414, a virtual address of the candidate page can be mapped to the uncompressed page with the same content as the candidate page. Moreover, data of the content of the first compressed page and the candidate page can be disregarded. The process can end at step S414. Conversely, in step S416, the candidate page can be stored into the second memory space 106, and data of the content of the candidate page and the first compressed page can be disregarded in the first memory space. The process can then end at step S416. Other details for each step can be analogized from descriptions for FIGS. 1-3 and are omitted here for brevity.

The method of the above embodiments can solve several issues of the ZRAM and KSM methods. First, the time overhead of the compressed page larger than the predetermined size becomes meaningful. Compared to the ZRAM method which wastes time on compressing pages that have bad compressed sizes and must be stored in uncompressed forms, the method of the embodiments can utilize the hash value produced by the compression to find the same pages and further merging them even though the pages have bad compressed sizes. Second, compared to the low speed of the KSM method that compares pages byte by byte, the method of the embodiments can speed up the comparison by using hash keys generated by compressing the pages. The comparison and searching by using hash keys can be further facilitated by using a specific data structure of hash values. Third, compared to KSM method that only compares pages belonging to the same window, the method of the embodiments can compare all pages obtained in the second memory space 106 at runtime, thus increasing discovery rate of same pages. Fourth, compared to the KSM method that only periodically finds the same page during the idle state, the method of the embodiments can find the same page immediately when a page is swapped out into the second memory space 106. Fifth, compared to the KSM method which has to scan all pages periodically to ensure all pages have been scanned, the method of the embodiments can save more power because pages are compared only when they are swapped out.

The above-described embodiments of the present invention can be implemented in any of numerous ways. For example, the embodiments may be implemented using hardware, software or a combination thereof. It should be appreciated that any component or collection of components that perform the functions described above can be generically considered as one or more processors that control the discussed above function. The one or more processors can be implemented in numerous ways, such as with dedicated hardware, or with general purpose hardware that is programmed using microcode or software to perform the functions recited above.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for managing memory space in an electronic device, wherein the electronic device comprises a first memory space and a second memory space, the method comprising:

selecting a candidate page from the first memory space of the electronic device for swapping the candidate page out of the first memory space into the second memory space;

compressing the candidate page to obtain a first compressed page and a first hash value of the first compressed page;

if the first compressed page is smaller than a predetermined size, performing a comparison using the first hash value of the first compressed page and one or more second hash values of one or more second compressed pages stored in the second memory space to find whether any of the one or more second compressed pages has the same content as the first compressed page, wherein a respective size of each of the one or more second compressed pages is smaller than the predetermined size;

mapping a virtual address of the first compressed page to one of the one or more second compressed page with the same content as the first compressed page;

if the first compressed page is larger than the predetermined size, performing a comparison using the first hash value of the first compressed page and one or more third hash values of one or more uncompressed pages stored in the second memory space to find whether any of the one or more uncompressed pages has the same content as the candidate page, wherein a respective size of each of one or more compressed pages obtained by compressing the one or more uncompressed pages is larger than the predetermined size; and mapping a virtual address of the candidate page to one of the one or more uncompressed pages with the same content as the candidate page.

2. The method as claimed in claim 1, further comprising maintaining a specific data structure under which the comparison is performed.

3. The method as claimed in claim 1, wherein the first memory space is a dynamic random-access memory.

4. The method as claimed in claim 3, wherein the second memory space is a virtual memory space divided from the dynamic random-access memory.

5. The method as claimed in claim 3, wherein the second memory space is a ZRAM.

6. A method for managing memory space in an electronic device, wherein the electronic device comprises a first memory space and a second memory space, the method comprising:
  selecting a candidate page from the first memory space of the electronic device for swapping the candidate page out of the first memory space into the second memory space;
  compressing the candidate page to obtain a first compressed page and a first hash value of the first compressed page;
  performing a comparison using the first hash value of the first compressed page and one or more hash values of one or more pages previously stored in the second memory space to find whether any of the pages has the same content as the first compressed page or the candidate page;
  if one page of the one or more pages is found to have the same content as the first compressed page or the candidate page, mapping a virtual address of the first compressed page or the candidate page to the found page; and
  identifying each of the candidate page and one or more previous candidate pages previously stored in the second memory space to belong to one or more groups respectively according to their respective sizes in compression forms, and in the comparison, the first hash value of the first compressed page and the one or more hash values of one or more pages within the same group as the candidate page is within the same group as the candidate page.

7. The method as claimed in claim 6, wherein if a size of the first compressed page is smaller than a predetermined size, the plurality of pages stored in the second memory space are compressed pages, wherein a respective size of each of the one or more second compressed pages is smaller than the predetermined size.

8. The method as claimed in claim 6, wherein if a size of the first compressed page is larger than a predetermined size, the plurality of pages stored in the second memory space are uncompressed pages, wherein a respective size of each of one or more compressed pages obtained by compressing the one or more uncompressed pages is larger than the predetermined size.

9. The electronic device as claimed in claim 6, wherein the second memory space is a ZRAM.

10. An electronic device, comprising:
  a first memory space;
  a second memory space; and
  a controller, configured to select a candidate page from the first memory space of the electronic device for swapping the candidate page out of the first memory space into the second memory space, and compress the candidate page to obtain a first compressed page and a first hash value of the first compressed page, wherein
  if the first compressed page is smaller than a predetermined size, the controller is further configured to perform a comparison using the first hash value of the first compressed page and one or more second hash values of one or more second compressed pages stored in the second memory space to find whether any of the one or more second compressed pages has the same content as the first compressed page, wherein a respective size of each of the one or more second compressed pages is smaller than the predetermined size, and map a virtual address of the first compressed page to one of the one or more second compressed page with the same content as the first compressed page, and
  if the first compressed page is larger than the predetermined size, the controller is further configured to perform a comparison using the first hash value of the first compressed page and one or more third hash values of one or more uncompressed pages stored in the second memory space to find whether any of the one or more uncompressed pages has the same content as the candidate page, wherein a respective size of each of one or more compressed pages obtained by compressing the one or more uncompressed pages is larger than the predetermined size, and map a virtual address of the candidate page to one of the one or more uncompressed pages with the same content as the candidate page.

11. The electronic device as claimed in claim 10, further comprising maintaining a specific data structure under which the comparison is performed.

12. The electronic device as claimed in claim 10, wherein the first memory space is a dynamic random-access memory.

13. The electronic device as claimed in claim 12, wherein the second memory space is a virtual memory space divided from the dynamic random-access memory.

14. An electronic device, comprising:
  a first memory space;
  a second memory space; and
  a controller, configured to select a candidate page from the first memory space of the electronic device for swapping the candidate page out of the first memory space into the second memory space, compress the candidate page to obtain a first compressed page and a first hash value of the first compressed page, performing a comparison using the first hash value of the first compressed page and one or more hash values of one or more pages previously stored in the second memory space to find whether any of the pages has the same content as the first compressed page or the candidate page, and if one page of the one or more pages is found to have the same content as the first compressed page or the candidate page, mapping a virtual address of the first compressed page or the candidate page to the found page, wherein the controller is further configured to identify each of the candidate page and one or more previous candidate pages previously stored in the second memory space to belong to one or more groups respectively according to their respective sizes in compression forms, and in the comparison, the first hash value of the first compressed page and the one or more hash values of one or more pages within the same group as the candidate page is within the same group as the candidate page.

15. The electronic device as claimed in claim 14, wherein if a size of the first compressed page is smaller than a predetermined size, the plurality of pages stored in the second memory space are compressed pages, wherein a respective size of each of the one or more second compressed pages is smaller than the predetermined size.

16. The method as claimed in claim 14, wherein if a size of the first compressed page is larger than a predetermined size, the plurality of pages stored in the second memory space are uncompressed pages, wherein a respective size of each of one or more compressed pages obtained by compressing the one or more uncompressed pages is larger than the predetermined size.

* * * * *